United States Patent
Feng et al.

(10) Patent No.: US 9,552,509 B2
(45) Date of Patent: Jan. 24, 2017

(54) METHOD AND SYSTEM FOR RECTIFYING DISTORTED FINGERPRINT

(71) Applicant: Tsinghua University, Beijing (CN)

(72) Inventors: Jianjiang Feng, Beijing (CN); Jie Zhou, Beijing (CN); Xuanbin Si, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 14/415,581

(22) PCT Filed: Aug. 22, 2014

(86) PCT No.: PCT/CN2014/084999
§ 371 (c)(1),
(2) Date: Jan. 17, 2015

(87) PCT Pub. No.: WO2015/176411
PCT Pub. Date: Nov. 26, 2015

(65) Prior Publication Data
US 2016/0132715 A1   May 12, 2016

(30) Foreign Application Priority Data

May 20, 2014  (CN) .......................... 2014 1 0214949

(51) Int. Cl.
*G06K 9/00* (2006.01)
*G06K 9/62* (2006.01)
*G06F 17/30* (2006.01)
*G06T 5/00* (2006.01)

(52) U.S. Cl.
CPC ....... *G06K 9/00067* (2013.01); *G06F 17/3028* (2013.01); *G06K 9/00087* (2013.01); *G06K 9/6206* (2013.01); *G06T 5/001* (2013.01)

(58) Field of Classification Search
None
See application file for complete search history.

(56) References Cited

U.S. PATENT DOCUMENTS 6,233,348 B1 *  5/2001  Fujii ................... G06K 9/00067
                                           382/125
2007/0058844 A1 * 3/2007  Fenrich .............. G06K 9/00046
                                           382/124

\* cited by examiner

*Primary Examiner* — Chan Park
*Assistant Examiner* — Elisa Rice
(74) *Attorney, Agent, or Firm* — Kile Park Reed & Houtteman LLC

(57) ABSTRACT

A method and a system for rectifying a distorted fingerprint are provided. The method includes following steps. A feature of a distorted fingerprint is extracted, a reference distorted fingerprint whose feature is matched with the feature of the distorted fingerprint is searched for in a reference distorted fingerprint database, a dense distortion field of the reference distorted fingerprint is obtained in the reference distorted fingerprint database and the distorted fingerprint is rectified to a normal one according to the dense distortion field of the reference distorted fingerprint.

7 Claims, 2 Drawing Sheets

METHOD AND SYSTEM FOR RECTIFYING DISTORTED FINGERPRINT

CROSS REFERENCE TO RELATED APPLICATION

This U.S. application claims priority under 35 U.S.C 371 to, and is a U.S. National Phase application of, the International Patent Application No. PCT/CN2014/084999, filed Aug. 22, 2014, which claims the benefit of prior Chinese Application No. 201410214949.1 filed May 20, 2014. The entire contents of the before-mentioned patent applications are incorporated by reference as part of the disclosure of this U.S. application.

FIELD

Embodiments of the present invention generally relate to a fingerprint identification technology, and more particularly, to a method and system for rectifying a distorted fingerprint.

BACKGROUND

Distortion of fingerprint is one of the important factors resulting in a false non-match, which may cause a bad effect on fingerprint applications, especially on a personal identification. Reasons for the fingerprint distortion are shown as follows: 1) a finger skin has an elasticity; 2) the finger is not flat; 3) during a fingerprint collection, a collector may use a lateral force or torque, and particularly when the lateral force or torque is too large, the fingerprint may be distorted severely.

There are four common methods for processing a distorted fingerprint in prior art.

A) A fingerprint sensor is reasonably designed and the collector is required to operate reasonably. However, this method has following defects: 1) the fingerprint which has been collected cannot be processed; 2) in practice, the collector should collect the fingerprints according to strict steps, which results in the low efficiency; 3) a distorted fingerprint resulted from a distortion of the skin itself (for example, the skin becomes wrinkled after putting it into water for a while) cannot be dealt with.

B) A hardware device is used to detect the distortion. For example, a pressure sensor is disposed under the collecting plane of a fingerprint collection instrument. The method has following defects: 1) a specific pressure sensor is required, which increases the cost of the hardware device; 2) the distorted fingerprint which has been collected using traditional sensors cannot be processed; 3) a distorted fingerprint resulted from a distortion of the skin itself cannot be dealt with.

C) A software device is used to detect the distortion. It is determined whether the fingerprint is distorted via a statistical learning method according to the difference in appearance between the distorted fingerprint and the normal fingerprint. However, with this method, the distorted fingerprint can only be detected, but cannot be matched to the normal fingerprint.

D) A certain distortion is allowed during the matching stage. A threshold for the distortion is set in the fingerprint matching algorithm, and in order to deal with the severe distortion, the threshold should be large enough. However, minutiae which should not be matched with each other may be matched with each other due to the large threshold, such that the similarity between the unmatched fingerprint pairs is increased.

A distortion rectification refers to converting the distorted fingerprint into the normal fingerprint. The distortion rectification is more complex than the distortion detection, because the distortion detection only needs to predict a two-valued variable but the distortion rectification needs to predict a distorted field which is a high dimensional vector, although the distortion rectification and the distortion detection have the same input (i.e., a fingerprint image). Therefore, it is difficult for the distortion rectification, and an effective method has not been proposed so far.

SUMMARY

Embodiments of the present invention seek to solve at least one of the problems existing in the related art to at least some extent.

Embodiments of a first broad aspect of the present invention provide a method for rectifying a distorted fingerprint. The method includes: extracting a feature of a distorted fingerprint; searching for a reference distorted fingerprint whose feature is matched with the feature of the distorted fingerprint in a reference distorted fingerprint database; obtaining a dense distortion field of the reference distorted fingerprint and rectifying the distorted fingerprint to a normal one according to the dense distortion field of the reference distorted fingerprint.

With the method according to embodiments of the present invention, the dense distorted field of the reference distorted fingerprint whose feature is matched with the feature of the distorted fingerprint is obtained in the reference distorted fingerprint database, i.e., the dense distortion field of the distorted fingerprint is obtained from the reference distorted fingerprint database according to the extracted feature, and the distorted fingerprint can be rectified effectively according to the dense distortion field, such that it is convenient to perform a further analysis based on the rectified fingerprint and the method also has an advantage of good transferability.

In some embodiments, the reference distorted fingerprint database is established by steps of: obtaining a plurality of reference normal fingerprints and reference distorted fingerprints corresponding to each other; obtaining the dense distortion field and the feature of each reference distorted fingerprint to generate the reference distorted fingerprint database.

In some embodiments, the plurality of reference distorted fingerprints are obtained via an actual collection or an artificial synthesis.

In some embodiments, the feature of a fingerprint includes an orientation field and/or a period map of the fingerprint.

In some embodiments, searching for the feature of a reference distorted fingerprint matched with the feature of the distorted fingerprint from a reference distorted fingerprint database includes: comparing the feature of the distorted fingerprint with the feature of the each reference distorted fingerprint to obtain a plurality of feature similarities; ranking the plurality of feature similarities in descending order, and selecting N reference distorted fingerprints with the feature similarities ranked in front as candidates, in which N is an integer number larger than or equal to one In some embodiments, if N is equal to one, the distorted fingerprint is rectified according to the dense distorted field of the selected one reference distorted fingerprint. If N is larger than one, the distorted fingerprint is rectified by N distorted fields of the selected N reference distorted fingerprints, respectively, and N rectified results are obtained.

In some embodiments, the feature similarity is calculated via a formula:

$$s = \frac{s_1^0 + s_2^0}{m}(w_1^0 s_1^0 + w_2^0 s_2^0) + \frac{s_1^p + s_2^p}{m}(w_1^p s_1^p + w_2^p s_2^p)$$

where s represents the feature similarity between a reference distorted fingerprint and the distorted fingerprint; $s_1^0$ and $s_2^0$ represent a number of similar blocks of the orientation field above a center point and the orientation field below the center point, respectively; $w_1^0$ and $w_2^0$ represent the weighted coefficient of $s_1^0$ and $s_2^0$, respectively; $s_1^P$ and $s_2^P$ represent a number of similar blocks of the period map above the center point and the period map below the center point, respectively; $w_1^P$ and $w_2^P$ represent the weighted coefficient of $s_1^P$ and $s_2^P$, respectively; and m represents the total number of blocks in an overlapping area of the reference distorted fingerprint and the distorted fingerprint.

Embodiments of a second broad aspect of the present invention provide a system for rectifying the distorted fingerprint. The system includes: an exacting module configured to extract a feature of the distorted fingerprint; a matching module configured to search for a reference distorted fingerprint whose feature is matched with the feature of the distorted fingerprint from a reference distorted fingerprint database; and a rectifying module configured to obtain a dense distortion field of the reference distorted fingerprint from the reference distorted fingerprint database, and to rectify the distorted fingerprint according to the dense distortion field of the reference distorted fingerprint.

With the system according to embodiments of the present invention, the dense distorted field of the reference distorted fingerprint whose feature is matched with the feature of the distorted fingerprint is obtained in the reference distorted fingerprint database, i.e., the dense distortion field of the distorted fingerprint is obtained from the reference distorted fingerprint database according to the extracted feature, and the distorted fingerprint can be rectified effectively according to the dense distortion field, such that it is convenient to perform a further analysis based on the rectified fingerprint and the system also has an advantage of good transferability.

In some embodiments, the reference distorted fingerprint database is established by a generating module, and the generating module includes: an obtaining unit configured to obtain a plurality of reference normal fingerprints and reference distorted fingerprints corresponding to each other; a generating unit configured to obtain a dense distortion field and a feature of each reference distorted fingerprint to generate the reference distorted fingerprint database.

In some embodiments, the plurality of reference distorted fingerprints are obtained via an actual collection or an artificial synthesis In some embodiments, the feature of a fingerprint comprises an orientation field and/or a period map of the fingerprint.

In some embodiments, the matching module includes: a comparing unit configured to compare the feature of the distorted fingerprint with the feature of the each reference distorted fingerprint to obtain a plurality of feature similarities; a ranking unit configured to rank the plurality of feature similarities in descending order; and a selecting unit configured to select N reference distorted fingerprints with the feature similarities ranked in front as candidates, in which N is an integer number larger than or equal to one.

In some embodiments, if N is equal to one, the rectifying module is further configured to rectify the distorted fingerprint according to the dense distorted field of the selected one reference distorted fingerprint; if N is larger than 1, the rectifying module is further configured to rectify the distorted fingerprint according to N dense distorted fields of the N selected reference distorted fingerprints respectively, and to obtain N rectified results.

In some embodiments, the feature similarity is calculated via a formula:

$$s = \frac{s_1^0 + s_2^0}{m}(w_1^0 s_1^0 + w_2^0 s_2^0) + \frac{s_1^p + s_2^p}{m}(w_1^p s_1^p + w_2^p s_2^p)$$

where s represents the feature similarity between a reference distorted fingerprint and the distorted fingerprint; $s_1^0$ and $s_2^0$ represent a number of similar blocks of an orientation field above a center point and an orientation field below the center point respectively; $w_1^0$ and $w_2^0$ represents a weighted coefficient of $s_1^0$ and $s_2^0$ respectively; $s_1^P$ and $s_2^P$ represent a number of similar blocks of a period map above the center point and a period map below the center point respectively; $w_1^P$ and $w_2^P$ represent a weighted coefficient of $s_1^P$ and $s_2^P$ respectively; and m represents a total number of blocks in an overlapping area of the reference distorted fingerprint and the distorted fingerprint.

Additional aspects and advantages of embodiments of present invention will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present invention will become apparent and more readily appreciated from the following descriptions made with reference to the accompanying drawings, in which.

DETAILED DESCRIPTION

Figure 1:
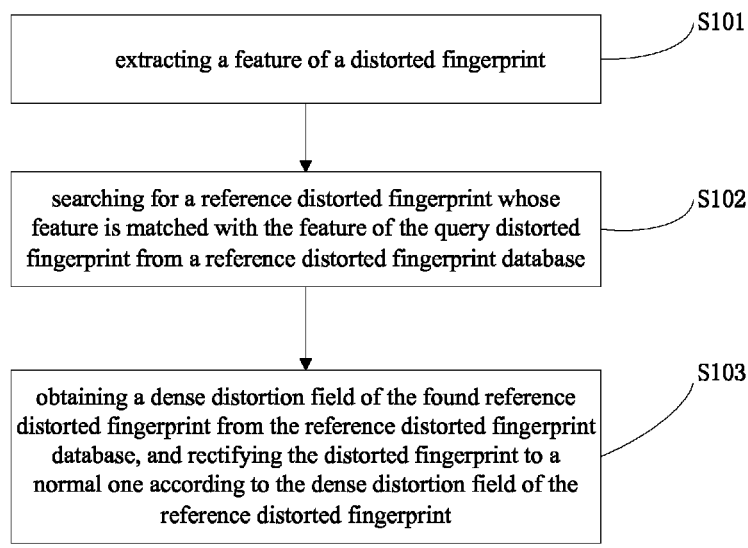
FIG. 1 is a flowchart of a method for rectifying a distorted fingerprint according to an embodiment of the present invention.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom", "inner", "outer", "clockwise", "anticlockwise" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance.

In the description of the present disclosure, unless specified or limited otherwise, it should be noted that, terms "mounted," "connected" "coupled" and "fastened" may be understood broadly, such as permanent connection or detachable connection, electronic connection or mechanical connection, direct connection or indirect connection via intermediary, inner communication or interreaction between two elements. These having ordinary skills in the art should understand the specific meanings in the present disclosure according to specific situations.

Figure 2:
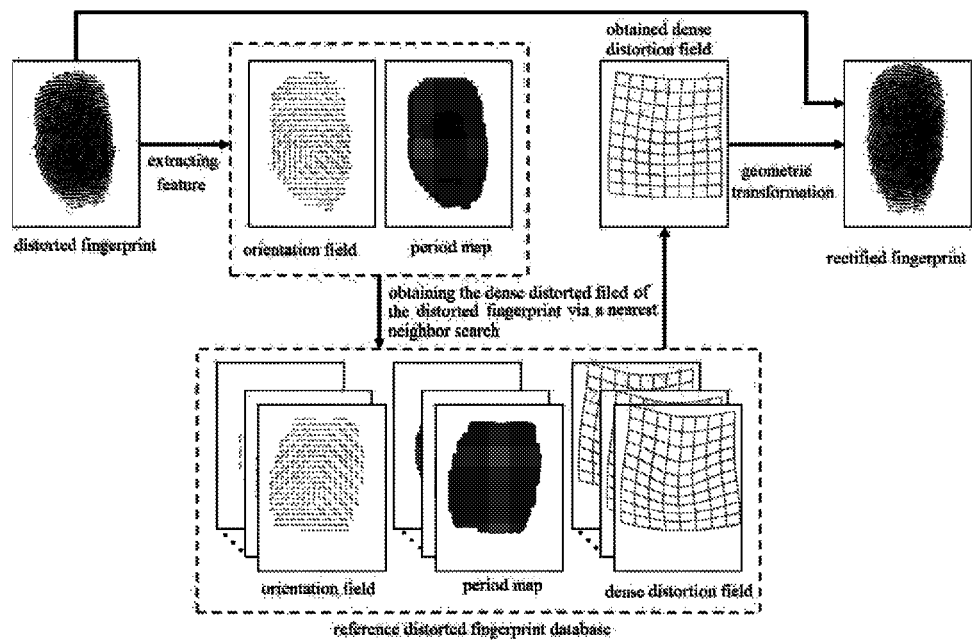
FIG. 2 is a schematic diagram showing a rectification procedure of a distorted fingerprint according to an embodiment of the present invention.

FIG. 1 is a flowchart of a method for rectifying a distorted fingerprint according to an embodiment of the present invention. FIG. 2 is a schematic diagram showing a rectification procedure of a distorted fingerprint according to an embodiment of the present invention.

As shown in FIGS. 1 and 2, a method for rectifying a distorted fingerprint according to an embodiment of the present invention includes following steps.

At step 101, a feature of a distorted fingerprint is extracted.

Specifically, the extracted feature can be an orientation field and/or a period map of the fingerprint. In following embodiment, a combination of the orientation field and the period map is taken as an example to illustrate the present invention.

At step 102, a reference distorted fingerprint whose feature is matched with the feature of the distorted fingerprint is searched for in a reference distorted fingerprint database.

In one embodiment, the reference distorted fingerprint database can be established by following steps.

At step 1, a plurality of reference distorted fingerprints and reference normal fingerprints corresponding to each other are obtained.

At step 2, a dense distortion field and a feature of each reference distorted fingerprint are obtained to generate the reference distorted fingerprint database.

Specifically, the plurality of reference distorted fingerprints can be obtained via an actual collection or an artificial synthesis, and the feature can be the orientation field and/or the period map In an embodiment of the present invention, first, a finger should be pressed on a fingerprint collection instrument in a normal manner to obtain the normal fingerprint, and then the finger is distorted in a plurality of directions to obtain a plurality of distorted fingerprints. Subsequently, corresponding points between the normal fingerprint and each of the plurality of distorted fingerprints are obtained via a video tracking algorithm or are manually marked out directly. Finally, the corresponding points are fitted by a mathematical model to obtain the dense distortion field of the distorted fingerprint. In an embodiment of the present invention, the corresponding points may be fitted by a polynomial model or a thin-plate spline model to obtain the dense distortion field of the distorted fingerprint. Each dense distortion field is applied to one or more normal fingerprints to generate the reference distorted fingerprint database.

In an embodiment of the present invention, the dense distortion field includes two matrixes, namely an X matrix and a Y matrix. An element in the X matrix represents a displacement of a corresponding position in an X direction. An element in the Y matrix represents displacement of a corresponding position in a Y direction.

In one embodiment, the step 102 further includes following steps.

At step 1021, the feature of the distorted fingerprint is compared with the feature of each reference distorted fingerprint to obtain a plurality of feature similarities.

At step 1022, the plurality of feature similarities are ranked in descending order.

Specifically, the orientation filed and the period map are extracted from the distorted fingerprint, and the extracted orientation filed and the period map are compared with the orientation filed and the period map of each reference distorted fingerprint in the reference distorted fingerprint database, in which a plurality of feature similarities therebetween are determined by a calculation. And then the plurality of feature similarities are ranked in descending order.

At step 1023, N reference distorted fingerprints with the feature similarities ranked in front are selected as candidates, wherein N is an integer number larger than or equal to one.

In an embodiment of the present invention, the feature similarity is calculated via a formula:

$$s = \frac{s_1^0 + s_2^0}{m}(w_1^0 s_1^0 + w_2^0 s_2^0) + \frac{s_1^P + s_2^P}{m}(w_1^P s_1^P + w_2^P s_2^P)$$

where s represents the feature similarity between a reference distorted fingerprint in the reference distorted fingerprint database and the distorted fingerprint to be rectified; $s_1^0$ and $s_2^0$ represent a number of similar blocks of an orientation field above a center point and an orientation field below the center respectively; $w_1^0$ and $w_2^0$ represent a weighted coefficient of $s_1^0$ and $s_2^0$ respectively; $s_1^P$ and $s_2^P$ represent a number of similar blocks of a period map above the center point and a period map below the center point respectively; $w_1^P$ and $w_2^P$ represent a weighted coefficient of $s_1^P$ and $s_2^P$ respectively; and m represents a total number of blocks in an overlapping area of the reference distorted fingerprint in the reference distorted fingerprint database and the distorted fingerprint to be rectified.

Alternatively, there are various methods for calculating a maximum similarity, such as a method of traversing a whole parameter space, a method based on a feature match, a method based on extended Hough transformation and a combination thereof, which will not be described in detail herein.

At step 103, a dense distortion field of the reference distorted fingerprint is obtained from the reference distorted fingerprint database, and the distorted fingerprint is rectified to a normal one according to the dense distortion field of the reference distorted fingerprint.

As described above, after the reference distorted fingerprint whose feature is matched with the feature of the distorted fingerprint is determined, the dense distortion field of the reference distorted fingerprint is obtained from the reference distorted fingerprint database, i.e., the dense distortion field of the distorted fingerprint is obtained, and then the dense distortion field is applied to the distorted fingerprint to obtain the rectified fingerprint. Specifically, a geometric transformation is performed on the distorted fingerprint according to the dense distortion field, for example using various geometric transformation models (including thin-plate spline model, polynomial model, etc.).

In an embodiment of the present invention, if N is equal to one, the distorted fingerprint is rectified according to the dense distorted field of the selected one reference distorted fingerprint; if N is larger than one, the distorted fingerprint is rectified according to N dense distorted fields of the N selected reference distorted fingerprints respectively, and N rectified results are obtained. The value of N can be determined according to specific applications.

Figure 3:
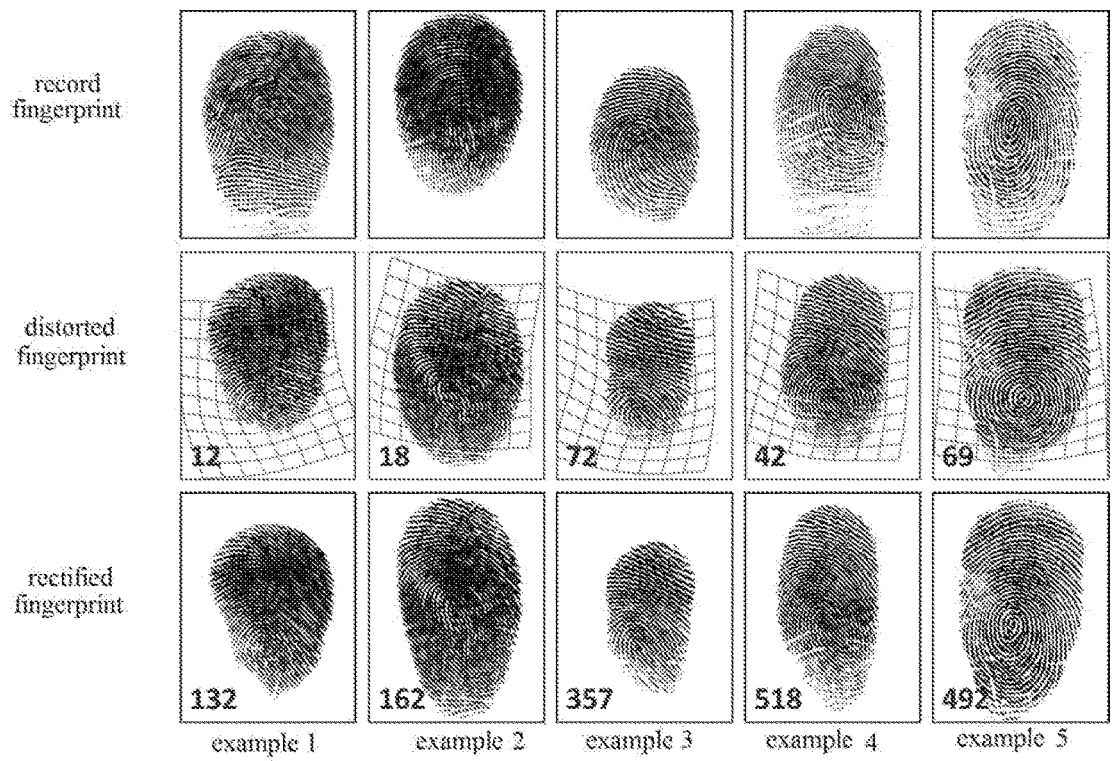
FIG. 3 is a diagram showing a rectification results of five distorted fingerprints by a method according to an embodiment of the present invention.

FIG. 3 is a diagram showing a rectification result of a distorted fingerprint by the method according to an embodiment of the present invention. As shown in FIG. 3, a lower left number in a fingerprint image represents a matching score between the distorted fingerprint (or a rectified fingerprint) and a record fingerprint (i.e., a normal fingerprint from the same finger as the distorted fingerprint). It can be seen from FIG. 3, a large distortion exists between the distorted fingerprint and the record fingerprint, such that a matching score for a direct match between the distorted fingerprint and the fingerprint in file is relatively lower. The distortion between the rectified fingerprint and the record fingerprint is greatly reduced, thus increasing the matching score significantly.

With the method according to embodiments of the present invention, the dense distorted field of the reference distorted fingerprint whose feature is matched with the feature of the distorted fingerprint is obtained in the reference distorted fingerprint database, i.e., the dense distortion field of the distorted fingerprint is obtained from the reference distorted fingerprint database according to the extracted feature of the distorted fingerprint, and the distorted fingerprint can be rectified effectively according to the dense distortion field, such that it is convenient to perform a further analysis based on the rectified fingerprint and the method also has an advantage of good transferability.

Figure 4:
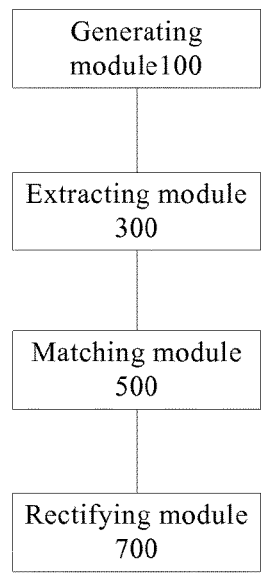
FIG. 4 is a block diagram of a system for rectifying a distorted fingerprint according to an embodiment of the present invention.

FIG. 4 is a block diagram of a system for rectifying a distorted fingerprint according to an embodiment of the present invention.

As shown in FIG. 4, the system for rectifying a distorted fingerprint according to an embodiment of the present invention includes an exacting module 300, a matching module 500 and a rectifying module 700.

Specifically, the exacting module 300 is configured to extract a feature of a distorted fingerprint. The matching module 500 is configured to search for a reference distorted fingerprint whose feature is matched with the feature of the distorted fingerprint from a reference distorted fingerprint database. The rectifying module 700 is configured to obtain a dense distortion field of the reference distorted fingerprint from the reference distorted fingerprint database, and to rectify the distorted fingerprint according to the dense distortion field of the reference distorted fingerprint.

In an embodiment of the present invention, the reference distorted fingerprint database is established by a generating module 100, and the generating module 100 includes: a obtaining unit and a generating unit. The obtaining unit is configured to obtain a plurality of reference normal fingerprints and reference distorted fingerprints corresponding to each other. For example, the obtaining unit can obtain a plurality of reference distorted fingerprints via an actual collection or an artificial synthesis. The generating unit is configured to obtain a dense distortion field and a feature of each reference distorted fingerprint to generate the reference distorted fingerprint database.

Specifically, with the obtaining unit, a finger should be pressed on a fingerprint collection instrument in a normal manner to obtain a normal fingerprint, and then the finger is distorted in a plurality of directions to obtain a plurality of distorted fingerprints. Subsequently, the generating unit obtains corresponding points between the normal fingerprint and each of the plurality of distorted fingerprints via a video tracking algorithm or a directly manual marking. Finally, the corresponding points are fitted by a mathematical model to obtain the dense distortion field of the distorted fingerprint. In an embodiment of the present invention, the corresponding points may be fitted by a polynomial model or a thin-plate spline model to obtain the dense distortion field of the distorted fingerprint. Each dense distortion field is applied to one or more normal fingerprints to generate the reference distorted fingerprint database.

In an embodiment of the present invention, the dense distortion field may include two matrixes, namely an X matrix and a Y matrix. An element in the X matrix represents a displacement of a corresponding position in an X direction. An element in the Y matrix represents a displacement of a corresponding position in a Y direction.

In an embodiment of the present invention, the feature extracted by the extracting module 300 may be an orientation field or a period map of a fingerprint. In the embodiment of the present invention, a combination of the orientation field and the period map of the fingerprint is taken as an example to illustrate the present invention.

The matching module 500 includes a comparing unit, a ranking unit and a selecting unit. The comparing unit is configured to compare the feature of the distorted fingerprint with the feature of each reference distorted fingerprint to obtain a plurality of feature similarities, the ranking unit configured to rank the plurality of feature similarities in descending order and the selecting unit is configured to select N reference distorted fingerprints with the feature similarities ranked in front as candidates, in which N is an integer number larger than or equal to one.

Specifically, after the extracting module 300 extracts the direction filed and the period map of the distorted fingerprint, the comparing unit compares the extracted direction filed and the period map with the direction filed and the period map of the each reference distorted fingerprint in the reference distorted fingerprint database, and determines the plurality of feature similarities therebetween by a calculation. Subsequently, the ranking unit ranks the plurality of feature similarities in descending order, and the selecting unit selects the N reference distorted fingerprints with the feature similarities ranked in front as the candidates.

In an embodiment of the present invention, the feature similarity is calculated via a formula:

$$s = \frac{s_1^0 + s_2^0}{m}(w_1^0 s_1^0 + w_2^0 s_2^0) + \frac{s_1^p + s_2^p}{m}(w_1^p s_1^p + w_2^p s_2^p)$$

where s represents the feature similarity between a reference distorted fingerprint in the reference distorted fingerprint database and the distorted fingerprint; $s_1^0$ and $s_2^0$ represent a number of similar blocks of an orientation field above a center point and an orientation field below the center point respectively; $w_1^0$ and $w_2^0$ represents a weighted coefficient of $s_1^0$ and $s_2^0$ respectively; $s_1^p$ and $s_2^p$ represent a number of similar blocks of a period map above the center point and a period map below the center point respectively; $w_1^P$ and $w_2^P$ represent a weighted coefficient of $s_1^P$ and $s_2^P$ respectively; and m represents a total number of blocks in an overlapping area of the reference distorted fingerprint in the reference distorted fingerprint database and the distorted fingerprint.

Alternatively, there are various methods for calculating a maximum similarity, such as a method of traversing a whole parameter space, a method based on a feature match, a method based on extended Hough transformation and a combination thereof, which will not be described in detail herein.

In an embodiment of the present invention, via a process described in above embodiments, the rectifying module 700 obtains the dense distortion field of the reference distorted fingerprint from the reference distorted fingerprint database, i.e., the dense distortion field of the distorted fingerprint is obtained, and then the distorted fingerprint is processed according to the dense distortion field thereof to obtain the normal fingerprint. Specifically, the rectifying module 700 performs a geometric transformation on the distorted fingerprint according to the dense distortion field, for example using various geometric transformation models (including thin-plate spline model, polynomial model, etc.).

In an embodiment of the present invention, if N is equal to one, the distorted fingerprint is rectified according to the dense distorted field of the selected one reference distorted fingerprint; if N is larger than one, the distorted fingerprint is rectified according to N dense distorted fields of the N selected reference distorted fingerprints respectively, and N rectified results are obtained. The value of N can be determined according to specific applications.

FIG. 3 is a diagram showing a rectification result of a distorted fingerprint by the method according to an embodiment of the present invention. As shown in FIG. 3, a lower left number in a fingerprint image represents a matching score between the distorted fingerprint (or a rectified fingerprint) and a record fingerprint (i.e., a normal fingerprint from the same finger as the distorted fingerprint). It can be seen from FIG. 3, a large distortion exists between the distorted fingerprint and the record fingerprint, such that a matching score for a direct match between the distorted fingerprint and the fingerprint in file is relatively lower. The distortion between the rectified fingerprint and the record fingerprint is greatly reduced, thus increasing the matching score significantly.

With the system according to embodiments of the present invention, the dense distorted field of the reference distorted fingerprint whose feature is matched with the feature of the distorted fingerprint is obtained in the reference distorted fingerprint database, i.e., the dense distortion field of the distorted fingerprint is obtained from the reference distorted fingerprint database according to the extracted feature of the distorted fingerprint, and the distorted fingerprint can be rectified effectively according to the dense distortion field, such that it is convenient to perform a further analysis based on the rectified fingerprint and the system also has an advantage of good transferability.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present invention. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A method for rectifying a distorted fingerprint, comprising:
    extracting a feature of a distorted fingerprint;
    searching for a reference distorted fingerprint whose feature is matched with the feature of the distorted fingerprint in a reference distorted fingerprint database; and
    obtaining a dense distortion field of the found reference distorted fingerprint in the reference distorted fingerprint database, and rectifying the distorted fingerprint to a normal one according to the dense distortion field of the reference distorted fingerprint.

2. The method according to claim 1, wherein the reference distorted fingerprint database is established by steps of:
    obtaining a plurality of reference normal fingerprints and reference distorted fingerprints corresponding to each other;
    obtaining a dense distortion field and a feature of each reference distorted fingerprint to generate the reference distorted fingerprint database.

3. The method according to claim 2, wherein the plurality of reference distorted fingerprints are obtained via an actual collection or an artificial synthesis.

4. The method according to claim 1, wherein the feature of the fingerprint comprises at least one of an orientation field and a period map of the fingerprint.

5. The method according to claim 1, wherein searching for a reference distorted fingerprint whose feature is matched with the feature of the distorted fingerprint in a reference distorted fingerprint database comprises:
    comparing the feature of the distorted fingerprint with the feature of the each reference distorted fingerprint to obtain a plurality of feature similarities;
    ranking the plurality of feature similarities in descending order; and
    selecting N reference distorted fingerprints with the feature similarities ranked in front as candidates, wherein N is an integer number larger than or equal to one.

6. The method according to claim 5, wherein
    if N is equal to one, the distorted fingerprint is rectified according to the dense distorted field of the selected one reference distorted fingerprint;
    if N is larger than 1, the distorted fingerprint is rectified according to N dense distorted fields of the N selected reference distorted fingerprints respectively, and N rectified results are obtained.

7. The method according to claim 5, wherein the feature similarity is calculated via a formula:

$$s = \frac{s_1^0 + s_2^0}{m}(w_1^0 s_1^0 + w_2^0 s_2^0) + \frac{s_1^P + s_2^P}{m}(w_1^P s_1^P + w_2^P s_2^P)$$

where s represents the feature similarity between a reference distorted fingerprint and the distorted fingerprint; $s_1^o$ and $s_2^o$ represent a number of similar blocks of an orientation field above a center point and an orientation field below the center point respectively; $w_1^o$ and $w_2^o$ represent a weighted coefficient of $s_1^o$ and $s_2^o$ respectively; $s_1^p$ and $s_2^p$ represent a number of similar blocks of a period map above the center point and a period map below the center point respectively; $w_1^p$ and $w_2^p$ represent a weighted coefficient of $s_1^p$ and $s_2^p$ respectively; and m represents a total number of blocks in an overlapping area of the reference distorted fingerprint and the distorted fingerprint.

* * * * *